United States Patent
Mishra et al.

(10) Patent No.: US 9,246,847 B2
(45) Date of Patent: Jan. 26, 2016

(54) EXTENDING THE REACH AND EFFECTIVENESS OF HEADER COMPRESSION IN ACCESS NETWORKS USING SDN

(71) Applicant: TELEFONAKTIEBOLAGET L M ERICSSON (PUBL), Stockholm (SE)

(72) Inventors: Ramesh Mishra, San Jose, CA (US); Ravi Manghirmalani, Fremont, CA (US); Ramesh Subrahmaniam, San Jose, CA (US)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 240 days.

(21) Appl. No.: 13/717,428

(22) Filed: Dec. 17, 2012

(65) Prior Publication Data
US 2014/0169158 A1    Jun. 19, 2014

(51) Int. Cl.
| | |
|---|---|
| H04L 12/28 | (2006.01) |
| H04L 12/935 | (2013.01) |
| H04L 29/06 | (2006.01) |
| H04L 12/741 | (2013.01) |
| H04L 12/24 | (2006.01) |
| H04L 12/721 | (2013.01) |

(52) U.S. Cl.
CPC ........ *H04L 49/3009* (2013.01); *H04L 41/0803* (2013.01); *H04L 45/74* (2013.01); *H04L 69/04* (2013.01); *H04L 69/22* (2013.01); *H04L 45/38* (2013.01)

(58) Field of Classification Search
None
See application file for complete search history.

(56) References Cited

U.S. PATENT DOCUMENTS

| | | | |
|---|---|---|---|
| 6,021,126 A | 2/2000 | White et al. | |
| 7,023,846 B1* | 4/2006 | Andersson et al. | 370/389 |
| 8,971,338 B2 | 3/2015 | Mishra et al. | |
| 2002/0110087 A1* | 8/2002 | Zelig et al. | 370/236 |
| 2003/0058798 A1* | 3/2003 | Fleischer et al. | 370/238 |
| 2004/0059828 A1* | 3/2004 | Hooper et al. | 709/238 |
| 2007/0053283 A1* | 3/2007 | Bidwell et al. | 370/216 |

(Continued)

FOREIGN PATENT DOCUMENTS

WO    WO-2012085898    6/2012

OTHER PUBLICATIONS

"OpenFlow Switch Specification", http://www.openflowswitch.org/documents/openflow-spec-v1.0.0.pdf; 42 pages.

(Continued)

*Primary Examiner* — Kevin C Harper
(74) *Attorney, Agent, or Firm* — Nicholson De Vos Webster & Elliot, LLP

(57) ABSTRACT

A method is executed by a controller in a software defined network to conserve bandwidth over the software defined networking (SDN) network by compressing Internet protocol (IP) headers of data packets traversing the SDN network. The IP headers of the data packets remain compressed as the data packets traverse the SDN network. The ingress switch is an entry point for the data packets as the data packets traverse the SDN network. The egress switch is an exit point for the data packets as the data packets traverse the SDN network. The method includes configuring a flow table of the ingress switch to forward the data packets to a header compressor module in the ingress switch, configuring the ingress switch to instantiate the header compressor module, and configuring a group table of the ingress switch to manage forwarding of the data packets toward the egress switch.

21 Claims, 10 Drawing Sheets

(56) References Cited

U.S. PATENT DOCUMENTS

| | | | | |
|---|---|---|---|---|
| 2007/0286219 | A1* | 12/2007 | Knop et al. | 370/401 |
| 2008/0049621 | A1* | 2/2008 | McGuire et al. | 370/236.2 |
| 2010/0322151 | A1 | 12/2010 | Racz et al. | |
| 2011/0032952 | A1* | 2/2011 | Rochon et al. | 370/477 |
| 2013/0170435 | A1* | 7/2013 | Dinan | 370/328 |
| 2013/0176850 | A1* | 7/2013 | Mishra | H04L 49/00 370/235 |
| 2013/0208621 | A1* | 8/2013 | Manghirmalani et al. | 370/254 |
| 2013/0259045 | A1* | 10/2013 | Johansson et al. | 370/392 |
| 2013/0304915 | A1* | 11/2013 | Kawai | 709/224 |
| 2014/0226527 | A1* | 8/2014 | Allan et al. | 370/254 |
| 2015/0146718 | A1* | 5/2015 | Wang | H04L 45/38 370/389 |

OTHER PUBLICATIONS

"OpenFlow Switch Specification", http://openflow.org/documents/openflow1.1-allmerged-draft2.pdf; 67 pages.

RFC 1144: Jacobson, V., "Compressing TCP/IP Headers for Low-Speed Serial Links," Network Working Group, Request for Comments, Feb. 1990, 45 pages.

RFC 2507: Degermark, et al., "IP Header Compression," Network Working Group, Request for Comments, The Internet Society, Feb. 1999, 48 pages.

RFC 3095: Bormann, et al., "RObust Header Compression (ROHC): Framework and four profiles: RTP, UDP, ESP, and uncompressed," Network Working Group, Request for Comments, The Internet Society, Jul. 2001, 169 pages.

RFC 3241: Bormann, C., "Robust Header Compression (ROHC) over PPP," Network Working Group, Request for Comments, The Internet Society, Apr. 2002, 12 pages.

* cited by examiner ation module configures a flow table of the ingress switch to forward the data packets to a header compressor module in the ingress switch. The switch configuration module configure the ingress switch to instantiate the header compressor module, and to configure a group table of the ingress switch to manage forwarding of the data packets toward the egress switch.

EXTENDING THE REACH AND EFFECTIVENESS OF HEADER COMPRESSION IN ACCESS NETWORKS USING SDN

FIELD OF THE INVENTION

Embodiments of the invention are related to traffic rate control in software defined networking networks having central controllers. Specifically, embodiments of the invention relate to the use of processing units in border switches of the software defined networking domain to implement header compression over paths traversing the software defined networking domain.

BACKGROUND

Unlike the traditional network architecture, which integrates both the data plane and the control plane in the same box (e.g., a network element such as a router), a software defined networking (SDN) network decouples these two planes and executes the control plane on servers (controllers) that might be in different physical locations from the forwarding elements (switches). The use of an SDN network enables the simplification of the switches and shifts the intelligence of the network into a number of controllers that oversee the switches.

The tight coupling of the forwarding and control planes in a traditional architecture usually results in an overly complicated control plane and complex network management. This is known to create a large burden and high barrier to new protocols and technology developments related to networking and improving network elements. Despite the rapid improvement of line speeds, port densities, and performance, the network control plane mechanisms have advanced at a much slower pace than the forwarding plane mechanisms.

In an SDN network, controllers collect information from switches, and compute and distribute the appropriate forwarding decisions to switches. Controllers and switches use a protocol to communicate and exchange information. An example of such protocol is OpenFlow (see the OpenFlow 1.1 Specification), which provides an open standard method for a switch to communicate with a controller, and this protocol has drawn significant interest from both academics and industry.

SUMMARY

A method is executed by a controller in a software defined network (SDN) to conserve bandwidth over the SDN network by compressing Internet protocol (IP) headers of data packets traversing the SDN network. A controller implements a control plane of the SDN network. The SDN network includes a plurality of switches implementing a data plane of the SDN network. The IP headers of the data packets remain compressed as the data packets travers the plurality of switches between an ingress switch and an egress switch in the plurality of switches. The ingress switch is an entry point for the data packets as the data packets traverse the SDN network. The egress switch is an exit point for the data packets as the data packets traverse the SDN network. The method includes configuring a flow table of the ingress switch to forward the data packets to a header compressor module in the ingress switch. The ingress switch is configured to instantiate the header compressor module. A group table of the ingress switch is configured to manage forwarding of the data packets toward the egress switch.

A network element executes a controller in a software defined networking (SDN) network to conserve bandwidth over the SDN network by compressing Internet protocol (IP) headers of data packets traversing the SDN network. The controller implements a control plane of the SDN network. The SDN network includes a plurality of switches implementing a data plane of the SDN network. The IP headers of the data packets remain compressed as the data packets traverse the plurality of switches between an ingress switch and an egress switch in the plurality of switches. The ingress switch is an entry point for the data packets as the data packets traverse the SDN network. The egress switch is an exit point for the data packets as the data packets traverse the SDN network. The network element includes a set of ingress ports configured to receive data from the plurality of switches, a set of egress ports that is configured to transmit data to the plurality of switches, and a network processor coupled to the set of ingress ports and egress ports. The network processor is configured to execute a switch configuration module. The switch configuration module configures a flow table of the ingress switch to forward the data packets to a header compressor module in the ingress switch. The switch configuration module configure the ingress switch to instantiate the header compressor module, and to configure a group table of the ingress switch to manage forwarding of the data packets toward the egress switch.

A method is executed by a switch in a software defined networking (SDN) network to conserve bandwidth in the SDN network by compressing Internet protocol (IP) headers of data packets traversing the SDN network. A controller implements a control plane of the SDN network. The SDN network includes a plurality of switches implementing a data plane of the SDN network. The IP headers of the data packets remain compressed as the data packets traverse the plurality of switches between an ingress switch and an egress switch in the plurality of switches. The ingress switch is an entry point for the data packets as the data packets traverse the SDN network. The egress switch is an exit point for the data packets as the data packets traverse the SDN network. The method includes receiving a data packet at the switch on an ingress port of the switch. The data packet is matched in a flow table pipeline by a destination and type of the data packet. A matched data packet is forwarded to a header compression module or header decompression module executed by a processing unit in the switch that is external to a flow table pipeline. A compression or decompression is executed of the data packet by the processing unit.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIGS. 4A and 4B represent a controller process that is used to manage the OpenFlow switches and program them with flows for header compression and decompression. The sequence of events mentioned in FIGS. 4A and 4B are provided by way of example and do not represent a strict order and the events can be carried out in parallel or in a different order.

FIG. 8 is a diagram of one embodiment of an example architecture implementing a header compressor as a processing unit that is external to a flow table pipeline.

FIG. 9 is a diagram of one embodiment of an example architecture implementing a header decompressor as a processing unit that is external to a flow table pipeline.

DETAILED DESCRIPTION

Figure 1:
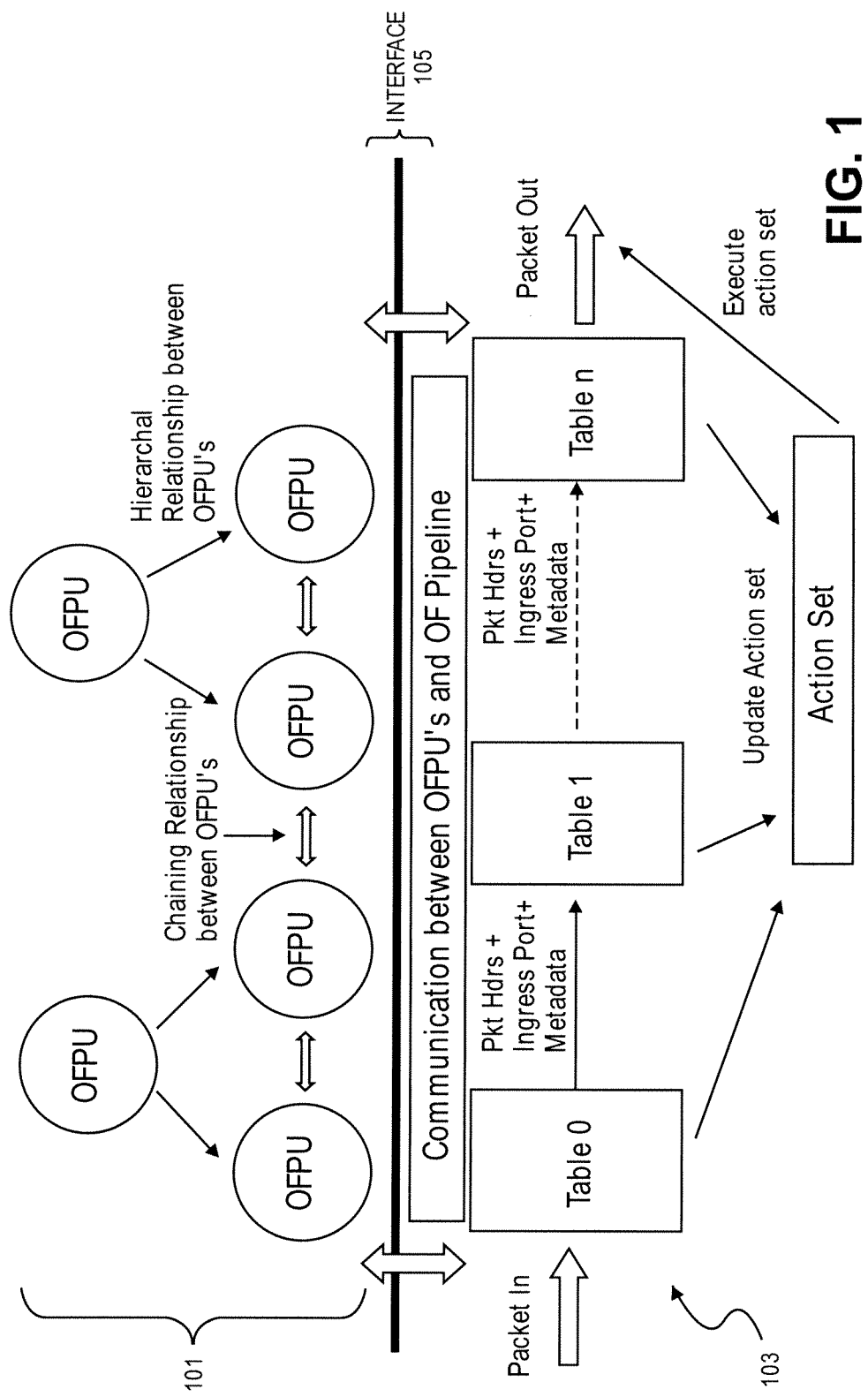
FIG. 1 is a diagram of one embodiment of an example architecture implementing processing units external to an OpenFlow flow table pipeline.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

The techniques shown in the figures can be implemented using code and data stored and executed on one or more electronic devices (e.g., an end station, a network element, server or similar electronic devices). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices (e.g., a keyboard, a touch screen, and/or a display), and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, or similar networking device.) is a piece of networking equipment, including hardware and software that communicatively interconnects other equipment on the network (e.g., other network elements, end stations, or similar networking devices). Some network elements are "multiple services network elements" that provide support for multiple networking functions (e.g., routing, bridging, switching, Layer 2 aggregation, session border control, multicasting, and/or subscriber management), and/or provide support for multiple application services (e.g., data collection).

In the following description and claims, the terms 'coupled' and 'connected,' along with their derivatives, may be used. It should be understood that these terms are not intended as synonyms for each other. 'Coupled' is used to indicate that two or more elements, which may or may not be in direct physical or electrical contact with each other, co-operate or interact with each other. 'Connected' is used to indicate the establishment of communication between two or more elements that are coupled with each other.

To ease understanding, dashed lines have been used in the figures to signify the optional nature of certain items (e.g., features not supported by a given implementation of the invention; features supported by a given implementation, but used in some situations and not in others).

Embodiments of the invention provide enhanced switch and controller functions that are highly efficient. The functions are "enhanced" because they are not supported by current SDN networks implemented using the OpenFlow specification (e.g., OpenFlow 1.1 specification). The enhanced switch functions are switch functions that are performed by an enhanced set of switches in the data plane of the SDN network. The enhanced control functions are control functions that are performed by an enhanced controller or set of controllers in the SDN network. A 'set,' as used herein refers to any positive whole number of items including one item. The example of a baseline SDN system is presented herein as the OpenFlow protocol and implementing system. However, one skilled in the art would understand that the principles and structures described in relation to an OpenFlow network, including switches and controllers implementing the OpenFlow protocol, could also be applied to other SDN networks.

The advantages of the embodiments of the invention provide efficient compression of header information in data flows that traverse the SDN network. The use of this compression reduces network bandwidth usage by these data flows and can be achieved with only the border switches of the network having to perform compression and decompression of the header information. The compression and decompression functions can be carried out by specialized processing units that are forwarded packets by a flow table operation.

The disadvantages of the prior art include a lack of available solutions for compression over an SDN network or similar network. IP header compression techniques have not been used in SDNs including SDNs using OpenFlow. The embodiments present an extension to SDN networks such as an OpenFlow network that enables compression of unnecessary Internet Protocol (IP) headers and similar header information to save bandwidth and increase throughput in data flows that traverse the SDN network. The embodiments overcome these disadvantages by providing a process to efficiently transport header compressed IP packets over multi-hop SDN networks leading to bandwidth savings and efficient use of expensive resources. The process and system also result in improved response time of small sized packets typical of mobile broadband flows. This process and system applies both to peer-to-peer and internet access traffic.

IP Header Compression

The Internet Protocol (IP) is the standard transport protocol on both wired and wireless networks and this is leading to the convergence of telecommunication and data networks. These converged networks will be the building blocks of the All-IP vision of networking.

As telecommunication networks evolve to provide more bandwidth, the applications, services and the customers of those applications and services, all compete for that bandwidth provided by these networks. For network operators it is important to offer a high quality of service (QoS) in order to attract more customers and encourage them to use their network as much as possible, thus achieving higher average revenue per user (ARPU).

In many services and applications, e.g., Voice over IP, interactive games, messaging and similar applications, the payload of the IP packets is almost of the same size or even smaller than the header. Over the end-to-end connection, comprised of multiple hops, these protocol headers are extremely important, but over just one link (hop-to-hop) these headers can be compressed (and must be uncompressed at the other end of the link). It is possible to compress these headers, providing in many cases more than 90% savings, and thus save the bandwidth and use the expensive resource more efficiently. IP header compression also provides other important benefits, such as reduction in packet loss and improved interactive response time.

IP header compression is the process of compressing excess protocol headers before transmitting them on a link and uncompressing them to their original state on reception at the other end of the link. It is possible to compress the protocol headers due to the redundancy in header fields of the same packet as well as consecutive packets of the same packet stream. However, existing IP head compression has limitations. The original Van Jacobson compression scheme was developed to increase the performance of IP/transmission control protocol (TCP) flows over low bandwidth links such as public telephone switched network (PSTN). It does not support compression of IP/user datagram protocol (UDP) flows since at the time it was developed UDP traffic was very low. This Van Jacobson compression scheme uses delta compression, sending only the difference in the value of the changing fields, to minimize the number of bits sent. The Van Jacobson compression scheme achieves compression from 40 bytes to on an average 4 bytes. It relies on the TCP recovery mechanism to recover from errors in the context due to bit errors and residual errors due to packet loss on the link. The Van Jacobson compression scheme is however unsuitable for wireless links and multimedia applications.

Subsequent IP header compression and the compressed real-time transmission protocol (CRTP) schemes made it possible to compress UDP as well as real-time transmission protocol (RTP) traffic. They essentially use a similar mechanism of delta compression as the Van Jacobson compression scheme. Rather than depending on the TCP recovery mechanisms these protocols add their own feedback mechanisms to recover from error conditions. They achieve compression up to 2 bytes. These schemes are suitable for wireless links with strong link layer checksum but are not robust enough to handle high bit error rates (BERs), high losses and long round trip times (RTTs).

Since high BER and long RTT are common on 2.5G and 3G communication network links, an efficient and robust compression scheme was needed. The RObust Header Compression (ROHC) scheme was developed to fulfill these criteria. It is an extensible framework of packet stream profiles, e.g., IP/UDP/RTP, IP/ESP, IP/UDP and Uncompressed. As new profiles are defined, e.g., IP/TCP, they can be easily added to the framework.

The ROHC scheme uses window based least significant bits encoding for the compression of dynamic fields in the protocol headers. Due to its feedback mechanism, ROHC is robust on wireless links with high BER and long RTT. It can achieve compression up to 1 byte and thus it is more efficient than other compression schemes. Even though it is complex compared to earlier schemes, it is suitable for wireless networks, which use the very expensive radio spectrum resource. In this regard, RFC3095 states, "[b]andwidth is the most costly resource in cellular links. Processing power is very cheap in comparison. Implementation or computational simplicity of a header compression scheme is therefore of less importance than its compression ratio and robustness."

The Robust Header Compression is an extensible framework consisting of the following profiles: (1) ROHC Uncompressed (Profile 0)—compresses packets, which cannot be compressed by any of the following profiles; (2) ROHC RTP (Profile 1)—compresses packets with IP/UDP/RTP protocol headers; ROHC UDP (Profile 2)—compresses packets with IP/UDP protocol headers; and ROHC ESP (Profile 3)—compresses packets with IP/ESP protocol headers.

As described earlier, it is possible to compress the protocol headers due to the redundancy in the header fields of the same packet as well as consecutive packets of the same packet stream or flow. A packet classifier can identify different packet streams or flows by the combination of parameters like protocol headers being carried in the packet, the source and destination addresses and the source and destination ports and similar parameters. Initially, a few packets are sent uncompressed and are used to establish the context on both sides of the link. The context comprises information about static fields, dynamic fields and their change pattern in protocol headers. This information is used by the compressor to compress the packet as efficiently as possible and then by the de-compressor to decompress the packet to its original state.

Header compression schemes like Van Jacobson compression (RFC 1144), and IPHC (RFC 2507) use the delta encoding method for the compression of header fields. Some of the fields in a packet flow remain constant like source and destination addresses in IP header, source and destination ports in UDP/TCP header and similar fields. Some fields change in a specific pattern like Identifier field in the IP header which can increase by 1 or by any other fixed number or can remain constant, usually zero, in some operating systems, while some fields change randomly from packet to packet like the checksum in UDP/TCP headers. The fields which remain constant need not to be sent to the next hop once the context is established on the compressor and the de-compressor sides whereas the fields which change randomly must be sent as they are. One can use various algorithms to compress the fields, which change in specific patterns. The delta encoding is one such algorithm. It simply calculates the difference between the fields in the consecutive packets. Using a method of self-describing variable length values it represents the difference in fewer bits. Even though the method is simple, it is not efficient in case of packet losses before and after compression. It is not robust enough for bit errors on the link and it can lead to packet losses at the de-compressor. The ROHC framework introduces a more complex algorithm to find patterns and to compress the field values. As it has been designed to work on cellular links, it is robust against bit errors, packet loss and long round trip times. It uses the Window-based Least Significant Bit (W-LSB) encoding algorithm.

Overview of IP Header Compression Process and System in a Software Defined Network The embodiments are applicable to a software defined network (SDN) to implement IP header compression on packets traversing the network. More specifically switches lying at the boundary of the network are configured with compression and de-compression modules. The paths traversing the SDN are configured to act as a single point-to-point links (mesh) between boundary switches which are configured to perform header compression such as implementing RoHC compressor(s)/de-compressor(s). When the data packets travel the internal links of the SDN network all the IP headers are compressed leaving only the outermost headers needed for traversing the or SDN network such as multi-protocol label switching (MPLS) labels and/or media access control (MAC) headers. In other words, IP packets have their headers compressed at the ingress switch and then an MPLS label is appended to enable traversal of the internal switches. The data packets emerge from the r SDN at the egress switch as usual after being decompressed.

An SDN network is a network where a controller or set of controllers manages a control plane and where the data plane of the network is implemented by a set of switches in communication with the controller. OpenFlow is a protocol for the control of such networks. Similarly, software defined networks are networks where overall control and management are implemented by a software protocol such as OpenFlow. For sake of convenience, the example of SDNs is used herein below in describing the embodiments. However, one skilled in the art would understand that the principles, functions and structures of the SDN described herein below are also applicable to SDN networks.

Processing Units External to Flow Table Pipeline

In one embodiment, compression and decompression of header information is accomplished using a mechanism to do data packet processing outside of the flow table pipeline (e.g., an OpenFlow pipeline). The mechanism is referred to as a processing unit and the processing unit has the ability to receive a data packet from the flow table pipeline, operate on the data packet, and then inject the modified data packet back in the pipeline. One example implementation is described in U.S. patent application Ser. No. 13/346,073. The processing units can be implemented as a modification to OpenFlow and in this context are referred to as OpenFlow processing units (OFPU). These processing units can perform compression and decompression, for example header compression, where the processing units are instantiated at switches that are border switches for the SDN. These processing units can be header compression modules or header decompression modules, or more specifically header IP compression and header IP decompression modules.

Switches in the data plane of the SDN implement flow tables that define actions to be performed for data packets with matching features, fields or similar characteristics. The flow tables pass data packets on to the next flow table in a sequence until all have been traversed. For example, each flow table in OpenFlow drops/continues to next flow table all the packets that do not match the flow tables. Any kind of function that is more complex or related to control or management that require some processing are sent to the controller.

However, if the function to be performed is time sensitive like OAM or in this case header compression, it can lead to high delays in forwarding packets if the function were to be carried out at the controller. Thus, the processing units have been developed to provide a mechanism to push some high frequency (time sensitive) processing to the data plane to maintain quality of service and similar telecommunication company grade requirements. These processing units are a functional block mechanism in addition to standard forwarding pipeline that work together to achieve this objective.

FIG. 1 is a diagram of one example embodiment of an architecture with processing unit external to the flow table pipeline. In this example, the processing units are implemented as OpenFlow processing units (OFPUs). The OFPUs can be configured as functional blocks that can do packet processing functions for the data plan. A processing unit such as an OFPU can be identified by an identifier (ID) that can be used by the flow tables to forward packets to the processing unit. The processing units can be configured to pass data and parameters to other processing units enabling the chaining of processing units. The processing units can also be organized into a hierarchy or similarly organized to divide the functionality to be executed over the data packets. The processing units can inject data packets back to the flow table pipeline at any point in the pipeline. The processing units can also be organized to send data packets out of the physical ports directly, rather than back to the flow table pipeline.

FIG. 1 shows a set of OFPUs 101 configured to communicate with the flow table pipeline 103 across an interface 105. The interface can be a set of threads established to receive forwarded data packets from the flow table pipeline and transmit processed data packets back to the flow table pipeline or to a physical port. The processing units 101 can have any number or organization to accomplish any function over the data packets. For example, the processing units can be configured to compress the header information of the incoming data packets or a particular subset of the data packets, such as those data packets received on defined ports and/or destined for defined ports.

The addition of processing units to the SDN architecture allows for time sensitive processing to happen on the data plane. In addition, the processing units enable extensions of functionality by the implementation of new types of processing units or by the organization and hierarchy of existing processing unit types. The processing units external to the flow table pipeline can be implemented in numerous manners.

In one embodiment, processing units are identified with a type and ID. Instances of the processing units can be instantiated by the controller of the SDN using a configuration protocol such as the OpenFlow configuration protocol. The processing units can also be statically created when the border switch is started up in its boot up process or as it is initialized by the controller. In one example embodiment, the OpenFlow specification is modified to add an additional instruction (e.g., GOTO OFPU_ID) which allows the flow table pipeline (e.g., an OpenFlow pipeline) to send data packets to the processing units. This instruction can also be utilized or configured to send some metadata to the processing units.

In order for the processing units to communicate and exchange data packets and metadata to each other interfaces are implemented between them to pass metadata and data packets between the processing units. In one embodiment, it can be prohibited or blocked for processing units to have any looping function, which means the processing units are accessed in sequential order just like the flow tables. In this approach, the input port field is not modified and is accessible to all forwarding tables as before.

In another embodiment, the processing units are modeled as a virtual port with an ID. The processing units are instantiated by the controller of the SDN, for example by the OpenFlow configuration protocol. In this embodiment, an additional instruction does not have to be added to the OpenFlow specification, because forwarding to these processing units can follow the regular flow table pipeline (e.g., OpenFlow pipeline) process with data packets being forwarded to the appropriate virtual port. However, in the OpenFlow example, once the data packet enters the OFPU pipeline the initial input port is lost.

Architecture for Header Compression in an SDN

Figure 2:
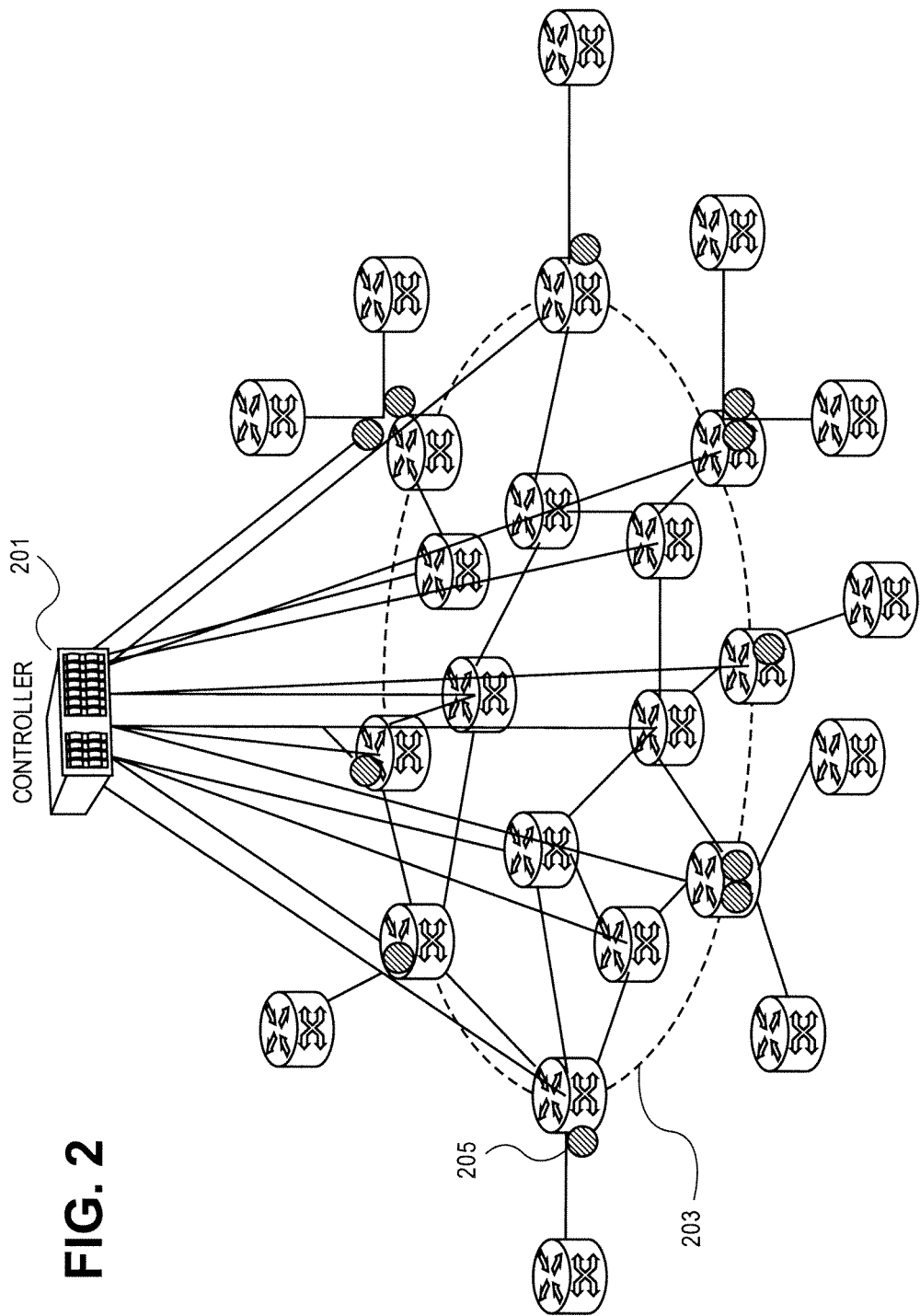
FIG. 2 is a diagram of one embodiment of a software defined network.

FIG. 2 is a diagram of one embodiment of an SDN including a controller and a set of switches. The controller 201 is in communication with the set of switches 203 that form the SDN. The controller 201 implements a control plane for the SDN using a protocol such as the OpenFlow protocol. The controller 201 can have direct or indirect communication with each of the switches 203. The switches 203 can be grouped into interior and border switches. The interior switches communicate only with other switches in the SDN. The border switches communicate with both interior switches and external devices. The external ports of the SDN are shown as circles in the illustration.

The header compression process and system is implemented in the border switches with the exterior ports 205 shown as circles in the example network. The interior switches do not have to be configured to support the header compression process. The IP headers and similar header and metadata are compressed at the ingress border switch as the data packet arrives at the SDN. The compressed header and metadata is undisturbed as it traverses the interior switches of the SDN. These switches use a label or similar encapsulation to forward the data packets over the SDN. When the data packets reach an egress switch, then the labels or encapsulation are removed and the interior headers and metadata such as IP headers are decompressed before the data packets are forwarded to external devices.

In one embodiment, the controller 201 instantiates compressors and decompressor as processing unites such as OFPU's on each of these border switches at boot up time. A general description of a processing unit and OFPU is presented in the section above. In one example embodiment, pre-provision multi-protocol label switching (MPLS) tunnels are utilized for connectivity between all the switches in the SDN. The mechanics of setting up MPLS tunnels are further discussed herein below. The compression utilized by the compression and decompression modules can be any type of compression including robust header compression (ROHC).

Figure 3:
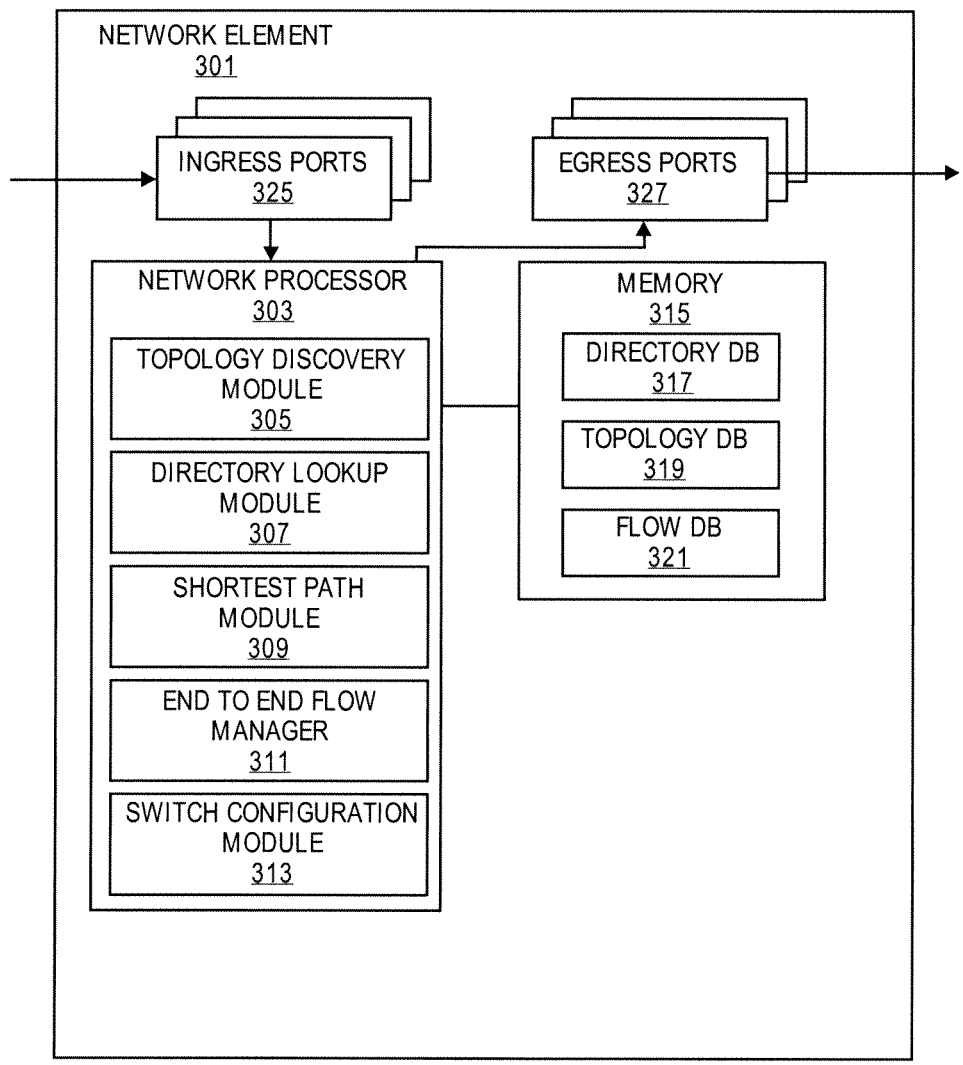
FIG. 3 is a diagram of one embodiment of a network element implementing a controller of the software defined network.

FIG. 3 is a diagram of one embodiment of a network element implementing the controller components for the header compression for the SDN. The controller 301 can be any type of computing device including a network element or other networking device. The controller 301 can include a set of ingress ports 325 and egress ports 327. The ingress ports 325 and egress ports 327 manage the receipt and transmission of control and data packets for the controller 301, respectively. The ingress ports 325 and egress ports 327 can perform L1/L2 processing of the data packets as they are received or sent to the switches of the SDN. The ingress ports 325 and egress ports 327 can communicate with a set of network processors 303 that implement the functions of the controller 301.

The data structures utilized by the controller can be stored in a local memory 315 or similar storage device. The network processor can execute a topology discover module 305, directory lookup module 307, shortest path module 309, end-to-end flow manager 311, and a switch configuration module 313. These modules can utilize a directory database 317, a topology database 319, a flow database 321 and similar data structures.

The topology database 319 contains information about the switches of the SDN and how they are interconnected. The shortest Path module 309 uses the topology database 319 to calculate shortest paths between two switches to find paths for data packets to traverse the SDN. The topology database 319 can be constructed and maintained by a topology discover module 305, which can utilize any discovery protocol or similar mechanism to obtain information about the topology of the SDN and the external networks.

The directory database 317 contains MAC address to switch and port mappings. The directory lookup module 207 can maintain and/or retrieve these mappings, which are utilizes for the configuration of the paths of data flows across the SDN. The flow database 321 contains information tracking the flows on every switch. The end-to-end flow management module 311 establishes and tracks the flows across the SDN in the flow database 321.

The switch configuration module 313 configures each of the switches in a data flow or data path across the SDN to compress the header and metadata information, such as IP header data that is not needed to forward the data packets across the SDN. The switch configuration module 313 operation is described further herein below. The switch configuration module 313 establishes the header compression modules and header decompression modules at the ingress switch and egress switch, respectively for each data flow that traverses the SDN. The process of establishing the header compression and decompression modules can be triggered in response to a notification of a new data flow from any of the border switches in the SDN.

Figure 4A:
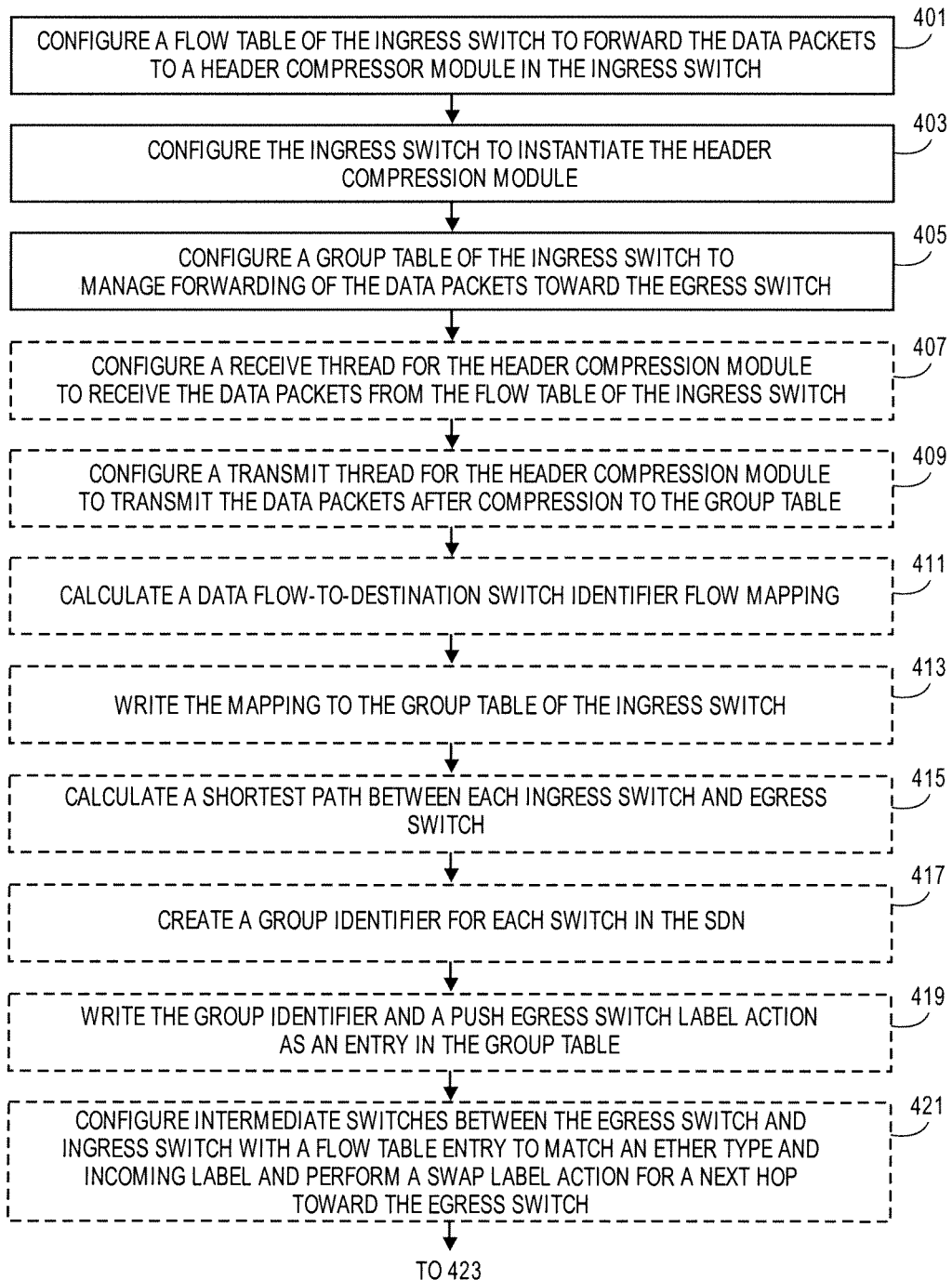
FIG. 4A is a flowchart of one embodiment of a process for header compression and decompression over a software defined network implemented by a controller.
Figure 4B:
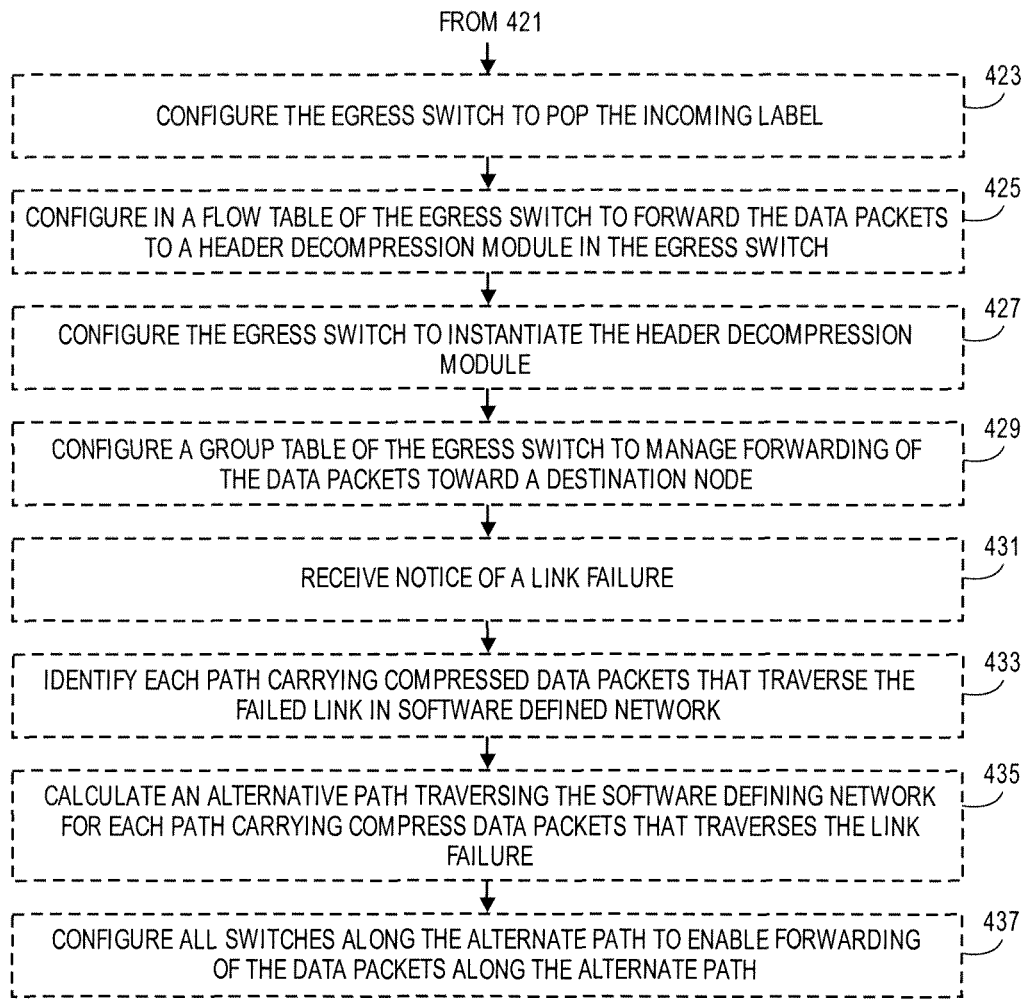
FIG. 4B is a flowchart of one embodiment of a process for header compression and decompression over a software defined network implemented by a controller.

FIGS. 4A and 4B illustrate a flowchart of one embodiment of a process of the controller to configure ingress, intermediate and egress switches of an SDN for header compression and decompression. The switch configuration module 313 can check whether any new flow is to have header compression. Any criteria can be defined by a network administrator to govern which flows receive header compression. The illustrated process is performed on a data flow by data flow basis, such that an ingress and egress switch for each data flow are configured for compression of header information. For a dataflow to be compressed, the controller configures the ingress switch with a flow entry in its flow table to designate data packets of the data flow to be forwarded to a header compression module in the ingress switch (Block 401).

The switch configuration module configures the ingress switch for a data flow to instantiate a header compression module, if one has not already been instantiated (Block 403). The header compression modules are processing units that are separate from the standard flow table pipeline of the ingress module. A set of header compression modules can be executed by the ingress switch with either a separate header compression module instantiated for each data flow or with header compression modules shared in any combination by the data flows traversing the ingress switch.

The switch configuration module configures a group table of the ingress switch to manage the forwarding of the data packets toward the egress switch (Block 405). In some embodiments, the switch configuration module establishes a receive thread for the header compression module to receive the data packets from the flow table of the ingress switch that are forwarded to the header compression module (Block 407). In other embodiments, a separate thread is not utilized. The data packets can be separately buffered or similarly handled without a separate receive thread. Similarly, a transmit thread for the header compression module can be established to transmit the data packet after compression by the compression module to transmit the compressed data packet to the group table (Block 409). In other embodiments, a separate thread is not utilize for the transmission and a shared thread or similar mechanism is utilized to forward the compressed data packet to the group table for further processing. In other embodiments, the switch configuration module is not responsible for establishing these threads, instead the switch can automatically establish such threads or the equivalent without direction from the switch configuration module of the controller.

The switch configuration module can calculate a data flow-to-destination switch identifier flow mapping (Block 411). This mapping is maintained by the controller to track the correspondence between data flows and their destination switches. This mapping can then be written to the group table of the ingress switch to enable proper forwarding of the data packets of each data flow (Block 413).

The shortest path module can calculate a shortest path between each ingress switch and egress switch (Block 415). This process can be done asynchronously with the other configuration steps as the topology of the SDN changes. A group identifier is created by the switch configuration module for each switch in the SDN (Block 417). These group identifiers can then be written to the group table of each ingress switch along with a push egress switch label action as an entry in the group table (Block 419). This process can also be asynchronous with the other configuration actions set forth herein. These entries enable the forwarding of the compressed data packets over the SDN.

The intermediate switches are also configured to support the forwarding of the compressed data packets over the SDN by configuring these intermediate switches along the path of the data flow to the egress switch such that each of these intermediate switches is configured with a flow table entry to match an ether type and incoming label of the data packets of the data flow. The action for matches in the entry is a swap label action for a next hop toward the egress switch for the data flow (Block 421).

The process continues in FIG. 4B. The process includes actions to configure the egress switch. One skilled in the art would understand that the ingress switch, intermediate switches and egress switch can be configured in any order, including in parallel or in another serialized order than that described. The presentation of the order of the actions of the process is by way of example and not limitation. The switch configuration module can perform the configurations of each of these switches, or in other embodiments, the configuration actions can be divided amongst any number of separate modules.

The switch configuration module can configure the egress switch to pop the incoming label of data packets in compressed data flows (Block 423), before forwarding these compressed data packets to header decompression modules (Block 425). As with the header compression modules, these decompression modules can be implemented by processing units that are separate from the flow table pipeline or similar data packet processing pipeline. The switch configuration module configures the egress switch to instantiate the header decompression module (Block 427). The header decompression module can be one of a set of header decompression modules, can be separately instantiated for each data flow or similarly configured at the egress switch.

The switch configuration module can configure the group table of the egress switch to manage the forwarding of the data packets toward a destination node (Block 429). The decompressed data packets can be forwarded by the group table. The switch configuration module can also configured receive and transmit threads for the header decompression module to receive the data packets from the pipeline and return the data packets to the pipeline.

The switch configuration process can also come into effect in response to link failures to reconfigure the route of the data flows while maintaining the header decompression. This process can take place in response to the notice of a link failure being received at the controller (Block 431). The controller identifies each path of a data flow that is carrying compressed data packets that traverses the failed link in the software defined network (Block 433). An alternate path is calculated for these paths that traverse the failed link in the software defined network (Block 435). Each switch in the alternate path is then configured by the switch configuration module to enable forwarding of the data packets along the alternate path such that the header compression is maintained (Block 437). The re-routing configuration can be managed by the switch configuration module in conjunction with the shortest path module to calculate the alternate path and the other modules of the controller to update the directory database, topology database and flow database.

Figure 5:
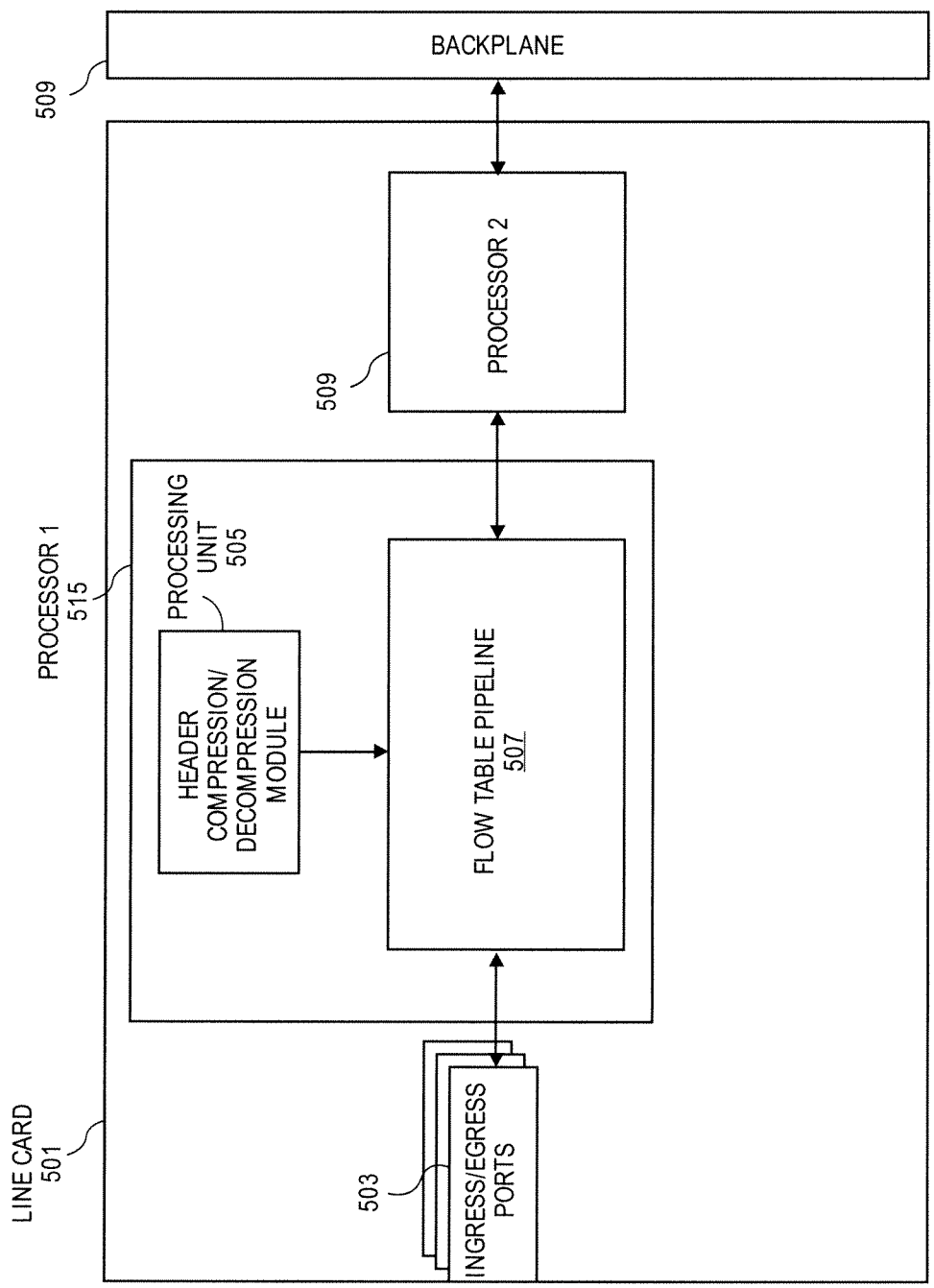
FIG. 5 is a diagram of one embodiment of a pipeline and header compression module in a switch of the software defined network. The linecard represented in the figure can act as a standalone OpenFlow switch or the system can be built such that an OpenFlow switch comprises several linecards connected over a backplane as shown in FIG. 6.

FIG. 5 is a diagram of one embodiment of a line card implementing the header compression or decompression process. The line card 501 includes a set of ingress or egress ports 503 to receive or transmit data packets over the software defined network. The line card 501 can also include a processor 515 that implements a data packet processing pipeline such as a flow table pipeline 507. This processor 515 or other processors 509 in the line card can execute the processing unit that implements the header compression or decompression module 505. The pipeline 507 implements the other data packet processing as defined in the flow table and group table entries. Additional processing can be performed by other processors 509 in the line card before the data packets are forwarded across a backplane 511 or similar interconnect to the line card that will forward the data packet toward a destination or as the data packet is received from another line card before being forwarded on the egress port 503 of the line card 501.

Figure 6:
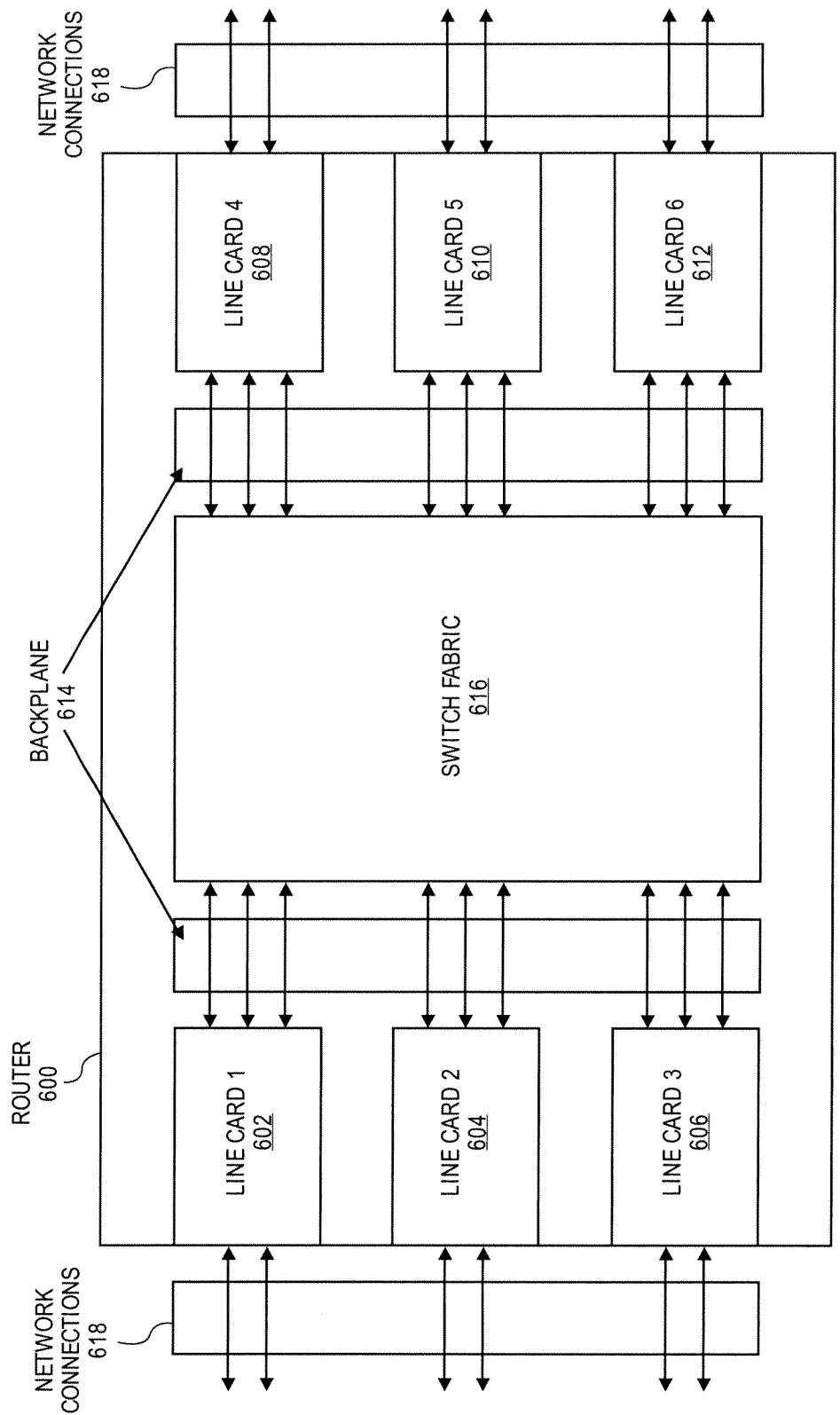
FIG. 6 is a diagram of one embodiment of a network element implementing a switch of the software defined network.

FIG. 6 is a diagram of one embodiment of the network element including at least one line card implementing the header compression or decompression process. The network element can be a router 600 or similar network element that serves as a switch in the software defined network. The network element 600 can be connected by any communication medium with other network elements over a set of network connections 618 that are serviced by the ports of the line cards 602-612 of the network element. Any number and variety of line cards can be utilized in the network element 600. The line cards 602-612 can communicate and forward packets amongst the line cards through a switch fabric 616 and backplane 614 of the network element 600. The switch fabric 616 enables point to point communication between any two line cards in the network element 600.

Figure 7:
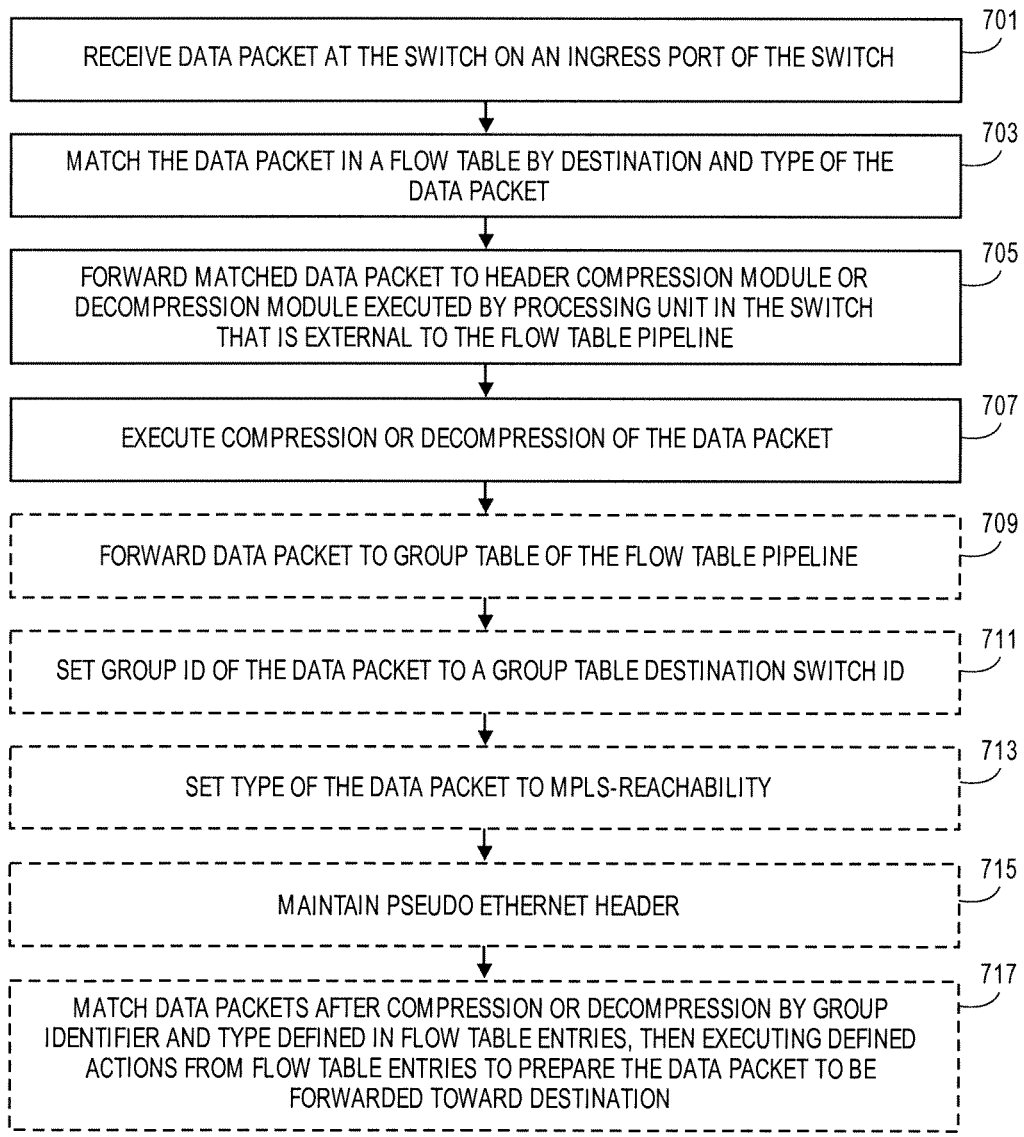
FIG. 7 is a flowchart of one embodiment of a process for header compression in a software defined network implemented by a border switch. The flowchart describes a general sequence of events to be executed by an OpenFlow switch for performing compression and decompression. The sequence of events are provided by way of example and not limitation. The sequence can have an alternate order in other embodiments.

FIG. 7 is a flowchart of one embodiment of a process implemented by the switch to implement header compression or decompression. The process can start in response to receiving a data packet at the switch on an ingress port of the switch, where this data packet is to be processed by a header compression or decompression module (Block 701). At the egress switch, where a compressed packet is being received, the MPLS label is removed (i.e., 'popped'). The data packet is matched in the flow table based on its destination and type (Block 703). The matching data packets are forwarded out of the flow table pipeline to the header compression module or decompression module, which is a processing unit in the switch that is external to the pipeline (e.g., an OFPU) (Block 705). The header compression module or decompression module executes the compression/decompression process on the received data packet. At the ingress switch, the compressed data packet is then forwarded to the group table of the flow table pipeline (Block 709) for further processing according to the defined entries in the group table. At the egress switch after the packet is decompressed, it is sent to a regular Openflow pipeline for lookup and forward (skipping Blocks 709-715).

In one embodiment, the group identifier (ID) for the data packet is set to a group table destination switch identifier (Block 711). The type of the data packet is set to MPLS-Reachability (Block 713). The pseudo-ethernet header data is maintained (Block 715) and data packets are otherwise matched based on the IDs and type of the data packets, which causes the defined actions of the corresponding entry in the table to be performed (Block 717) to prepare the data packets to be forwarded toward their destination. Any number or type of additional actions can be defined that can be applied to the process.

Figure 8:
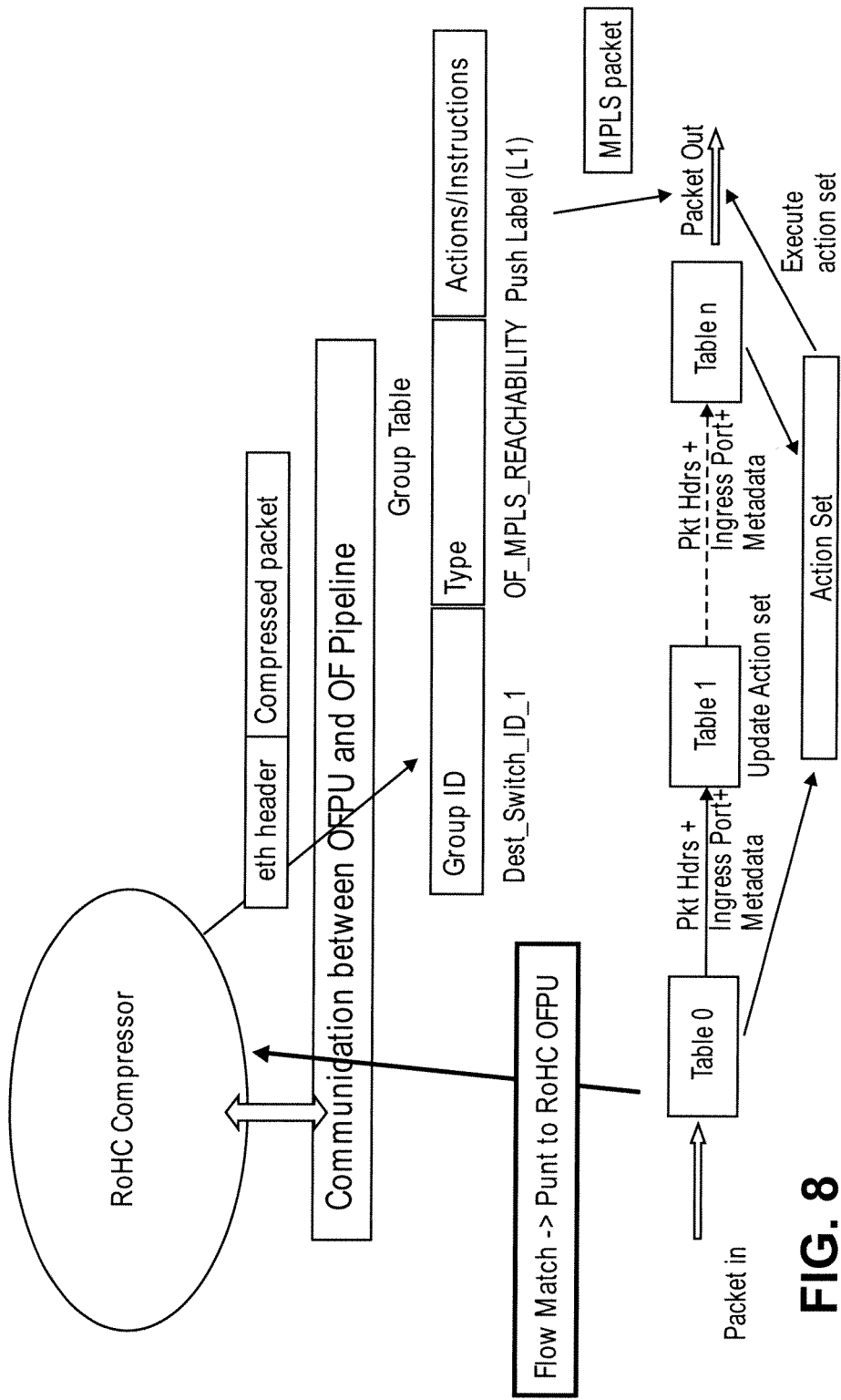
FIGS. 8 and 9 provide additional detail for these events.

FIG. 8 is a diagram of an example embodiment of the compression process as executed by an ingress switch. In this example, the compression is RoHC compression that is implemented in an OpenFlow processing unit (OFPU) in a software defined network that is an OpenFlow network. Thus, the header compression module is implemented as an OFPU at switch bootup time by an out of band configuration protocol that can reside on the data path itself or outside of the data path. The controller creates the relevant receive and transmit threads for processing packets coming to the OFPU as well as the packets it needs to send back to the OF pipeline. The role of this OFPU block is to implement the RoHC compression mechanism to compress the IP header of the data packets coming in to it. OFPU maintains all states of the RoHC process and is responsible for adequately compressing the IP header of the packet.

As an example, the OFPU block is responsible for sending out Initialization packets to the paired decompressor on the destination switch. Once the context is established it moves into full state. Once the packets are compressed the RoHC compression mechanism provides the compressed data packet to the transmit thread, which in turn sends the data packet to the group table, setting the Group ID with the destination switch ID and the type to be OF_MPLS_REACHABILITY. This group type is described further herein below. The destination switch ID is obtained from the metadata it obtains when switch receives the data packet.

The OpenFlow controller takes care of programming the group table with the correct group ID and type and OF actions and instructions, which results in an MPLS packet being sent out to the destination switch ID. These steps are also illustrated in FIG. 7.

Figure 9:
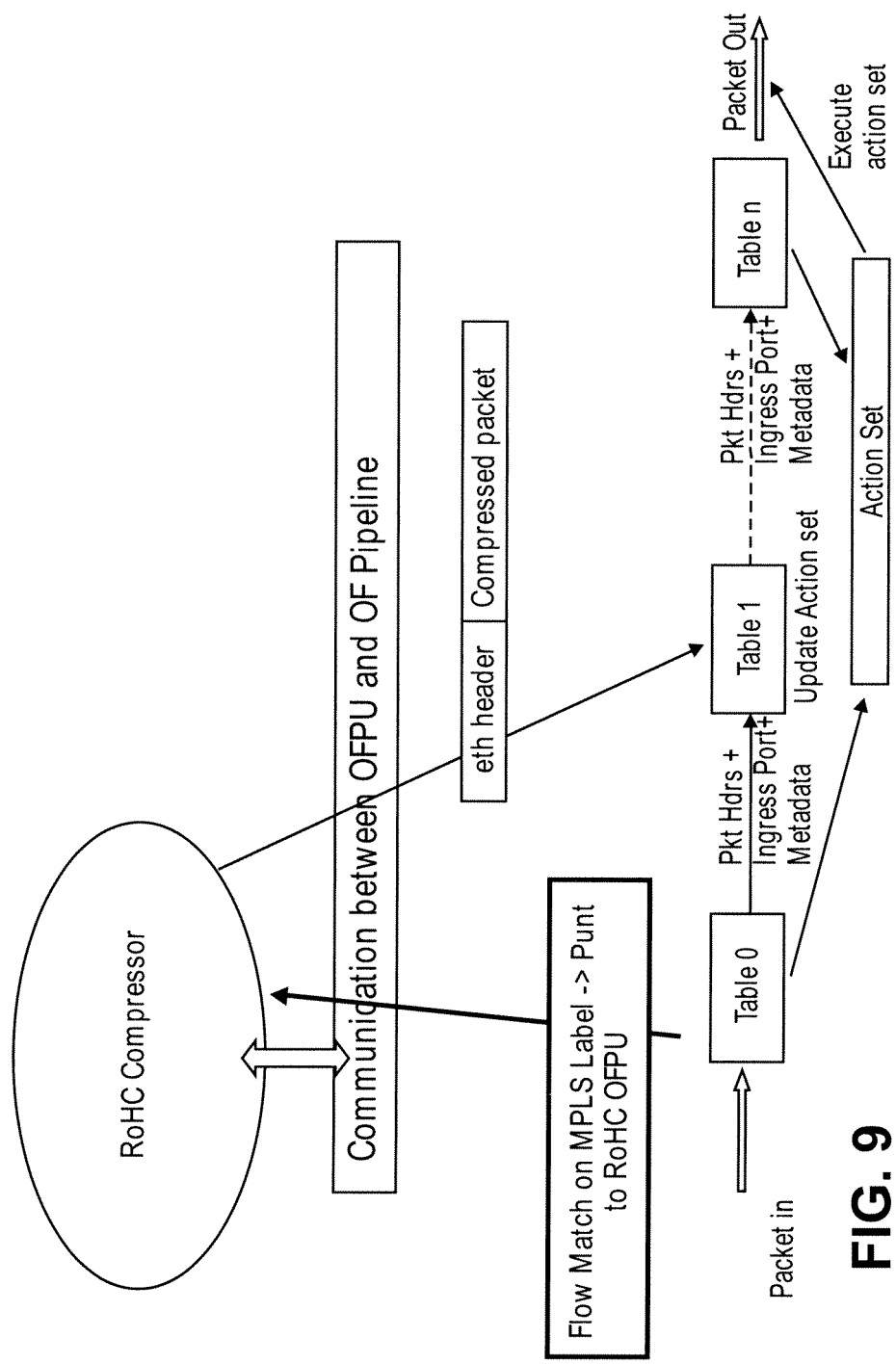

FIG. 9 is a diagram of one embodiment of the decompression process implemented in an egress switch. In the example embodiment, the decompression is RoHC decompressor implemented by an OpenFlow OFPU. This decompressor OFPU is configured at switch bootup time by an out of band configuration protocol that may reside on the datapath itself or outside of it. It creates the relevant receive and transmit threads for processing packets coming to the OFPU as well the packets the OFPU needs to send back to the OF pipeline. The decompressor OFPU implements the decompressor side of the RoHC process as described herein above. On getting a packet from the OF data path, the switch simply inspects the content of the packet and either decompresses it or sends a reply to compressor for it's IR packet. Once it has decompressed the packet it sends it to the OF data path for normal processing. The OF controller programs the flows to forward this flow out of the correct port as described herein above.

Pre-Provisioned MPLS Tunnels Between all Switches in Centralized Domains

The topology database maintained by the controller contains information on all the switches in its control and their connectivity. On all these switches MPLS tunnels can be created to maintain a full mesh of connectivity between these switches. In essence, if there are "N" number of switches in the network, the pre-creation $N*(N-1)/2$ bidirectional tunnels. In order to create these tunnels the Group table concept in Openflow is implemented. A new group type were particulare doner for this purpose which is named for example as OF_MPLS_REACHABILTY. This group type is used to forward RoHC MPLS packets to the correct destination switch ID. These steps can describe as:

For every external facing switch a new Group Type is created for OF_MPLS_REACHABILTY. External switches are the ones having external facing ports which are depicted in FIG. 6. For every source and destination switch pair (S_source and S_dest) the following happens the controller calculates the shortest path between these switches. The source switch (S_source) we create "N-1" group ID's for each of the respective destination switches (S_dest) with an action to "Push a Label". In each of the middle switches we create a flow entry in table 0 to match on ethertype and incoming label and perform a swap action. For the destination switch (S_dest) a flow is created to pop the incoming label and forward the packet to the decompressor OFPU if programmed by the controller.

The operations of the flow diagrams have been described with reference to the exemplary embodiment of the block diagrams. However, it should be understood that the operations of the flowcharts can be performed by embodiments of the invention other than those discussed, and the embodiments discussed with reference to block diagrams can perform operations different than those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the enhanced controller and switches may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices;

phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method executed by a controller in a software defined network (SDN) to conserve bandwidth over the SDN network by compressing Internet protocol (IP) headers of data packets traversing the SDN network, where the controller implements a control plane of the SDN network, where the SDN network includes a plurality of switches implementing a data plane of the SDN network, and where the IP headers of the data packets remain compressed as the data packets travers the plurality of switches between an ingress switch and an egress switch in the plurality of switches, the ingress switch being an entry point for the data packets as the data packets traverse the SDN network, the egress switch being an exit point for the data packets as the data packets traverse the SDN network, the method comprising the steps of:
    configuring a flow table of the ingress switch to forward the data packets to a header compressor module in the ingress switch, the flow table in a flow table pipeline;
    configuring the ingress switch to instantiate the header compressor module, where the header compressor module is configured to return data packets to a group table of the flow table pipeline after compression; and
    configuring the group table of the ingress switch to manage forwarding of the data packets toward the egress switch.

2. The method of claim 1, further comprising the step of:
    configuring a receive thread for the header compression module to receive the data packets from the flow table of the ingress switch.

3. The method of claim 1, further comprising the step of:
    configuring a transmit thread for the header compression module to transmit the data packets after compression to the group table.

4. The method of claim 1, wherein configuring the group table further comprises the step of:
    calculating a data flow to destination switch identifier flow mapping; and
    writing the mapping to the group table of the ingress switch.

5. The method of claim 1, wherein configuring the group table further comprises the steps of:
    calculating a shortest path between each ingress switch and egress switch pair;
    creating a group identifier for each egress switch for the ingress switch; and
    writing the group identifier and a push egress switch label action as an entry in the group table.

6. The method of claim 1, further comprising the step of:
    configuring intermediate switches between the egress switch and ingress switch with a flow table entry to match an ether type and incoming label and perform a swap label action for a next hop toward the egress switch.

7. The method of claim 1, further comprising the step of:
    configuring the egress switch to pop the incoming label and forward data packets to a header decompressor module in the egress switch.

8. The method of claim 1, further comprising the steps of:
    receiving notice of a link failure;
    identifying each path carrying compressed data packets that traverse the software defined network and includes the link failure;
    calculating an alternative path traversing the software defined network for each path carrying compressed data packets that traverses the link failure; and
    configuring all switches along the alternate path to enable forwarding of the data packets along the alternate path.

9. A network element to execute a controller in a software defined networking (SDN) network to conserve bandwidth over the SDN network by compressing Internet protocol (IP) headers of data packets traversing the SDN network, where the controller implements a control plane of the SDN network, where the SDN network includes a plurality of switches implementing a data plane of the SDN network, and where the IP headers of the data packets remain compressed as the data packets traverse the plurality of switches between an ingress switch and an egress switch in the plurality of switches, the ingress switch being an entry point for the data packets as the data packets traverse the SDN network, the egress switch being an exit point for the data packets as the data packets traverse the SDN network, the network element comprising:
    a set of ingress ports configured to receive data from the plurality of switches;
    a set of egress ports configured to transmit data to the plurality of switches; and
    a network processor coupled to the set of ingress ports and egress ports, the network processor configured to execute a switch configuration module, the switch configuration module to configure a flow table in a flow table pipeline of the ingress switch to forward the data packets to a header compressor module in the ingress switch, to configure the ingress switch to instantiate the header compressor module where the header compressor module forwards the data packets to a group table of the flow table pipeline after compression, and to configure the group table of the ingress switch to manage forwarding of the data packets toward the egress switch.

10. The network element of claim 9, wherein the switch configuration module is further configured to create a receive thread for the header compression module to receive the data packets from the flow table of the ingress switch.

11. The network element of claim 9, wherein the switch configuration module is further configured to create a transmit thread for the header compression module to transmit the data packets after compression to the group table.

12. The network element of claim 9, wherein the switch configuration module is further configured to calculate a data flow to destination switch identifier flow mapping, and to write the mapping to the group table of the ingress switch.

13. The network element of claim 9, wherein the switch configuration module is further configured to obtain a shortest path between each ingress switch and egress switch pair from a shortest path module, to create a group identifier for each egress switch for the ingress switch, and to write the group identifier and a push egress switch label action as an entry in the group table.

14. The network element of claim 9, wherein the switch configuration module is further configured to configure intermediate switches between the egress switch and ingress switch with a flow table entry to match an ether type and incoming label and perform a swap label action for a next hop toward the egress switch.

15. The network element of claim 9, wherein the switch configuration module is further configured to configure the egress switch to pop the incoming label and forward data packets to a header decompressor module in the egress switch.

16. The network element of claim 9, wherein the switch configuration module is further configured to receive notice of a link failure, to identify each path carrying compressed data packets that traverse the software defined network and includes the link failure, to calculate an alternative path traversing the software defined network for each path carrying compressed data packets that traverses the link failure, to configuring all switches along the alternate path to enable forwarding of the data packets along the alternate path.

17. A method executed by a switch in a software defined networking (SDN) network to conserve bandwidth in the SDN network by compressing Internet protocol (IP) headers of data packets traversing the SDN network, where a controller implements a control plane of the SDN network, where the SDN network includes a plurality of switches implementing a data plane of the SDN network, and where the IP headers of the data packets remain compressed as the data packets traverse the plurality of switches between an ingress switch and an egress switch in the plurality of switches, the ingress switch being an entry point for the data packets as the data packets traverse the SDN network, the egress switch being an exit point for the data packets as the data packets traverse the SDN network, the method comprising the steps of:

receiving a data packet at the switch on an ingress port of the switch;

matching the data packet in a flow table pipeline by a destination and type of the data packet, the flow table pipeline executed by a processor of the switch;

forwarding a matched data packet to a processing unit implementing a header compression module, the processing unit executed by the processing unit in the switch, where the processing unit is separate from the flow table pipeline;

executing a compression or decompression of the data packet by the processing unit;

setting a group identifier of the data packet to a destination switch identified by the processing unit;

setting the type of the data packet to multi-protocol label switching reachability by the processing unit;

forwarding the data packet by the processing unit to the group table of the flow table pipeline;

matching the data packet after compression by a group identifier and type defined in a flow table entry at the flow table pipeline; and executing defined actions of the flow table entry to prepare the data packet to be forwarded toward a destination at the flow table pipeline.

18. A network element to execute as a switch in a software defined networking (SDN) to conserve bandwidth over the SDN network by compressing Internet protocol (IP) headers of data packets traversing the SDN network, where a controller implements a control plane of the SDN network, where the SDN network includes a plurality of switches implementing a data plane of the SDN network, and where the IP headers of the data packets remain compressed as the data packets traverse the plurality of switches between an ingress switch and an egress switch in the plurality of switches, the ingress switch being an entry point for the data packets as the data packets traverse the SDN network, the egress switch being an exit point for the data packets as the data packets traverse the SDN network, the network element comprising:

an ingress port configured to receive a data packet at the switch;

a flow table pipeline configured to match the data packet by a destination and type of the data packet, and to forward a matched data packet to a header compression module or header decompression module; and a processing unit configured to execute the header compression module or decompression module, where the processing unit is external to a flow table pipeline, the header compression module or decompression module to execute a compression or decompression of the data packet, the processing unit to forward the data packet to a group table of the flow table pipeline after the compression or decompression of the data packet.

19. The network element of claim 18, wherein the flow table pipeline is further configured to set a group identifier of the data packet to a destination switch identifier.

20. The network element of claim 18, wherein the flow table pipeline is further configured to set the type of the data packet to multi-protocol label switching reachability.

21. The network element of claim 18, wherein the flow table pipeline is further configured to match the data packet after compression by a group identifier and type defined in a flow table entry, and to execute defined actions of the flow table entry to prepare the data packet to be forwarded toward destination.

* * * * *